A. DOAN.
AIR BRAKE SYSTEM.
APPLICATION FILED NOV. 13, 1909.
969,046.
Patented Aug. 30, 1910.
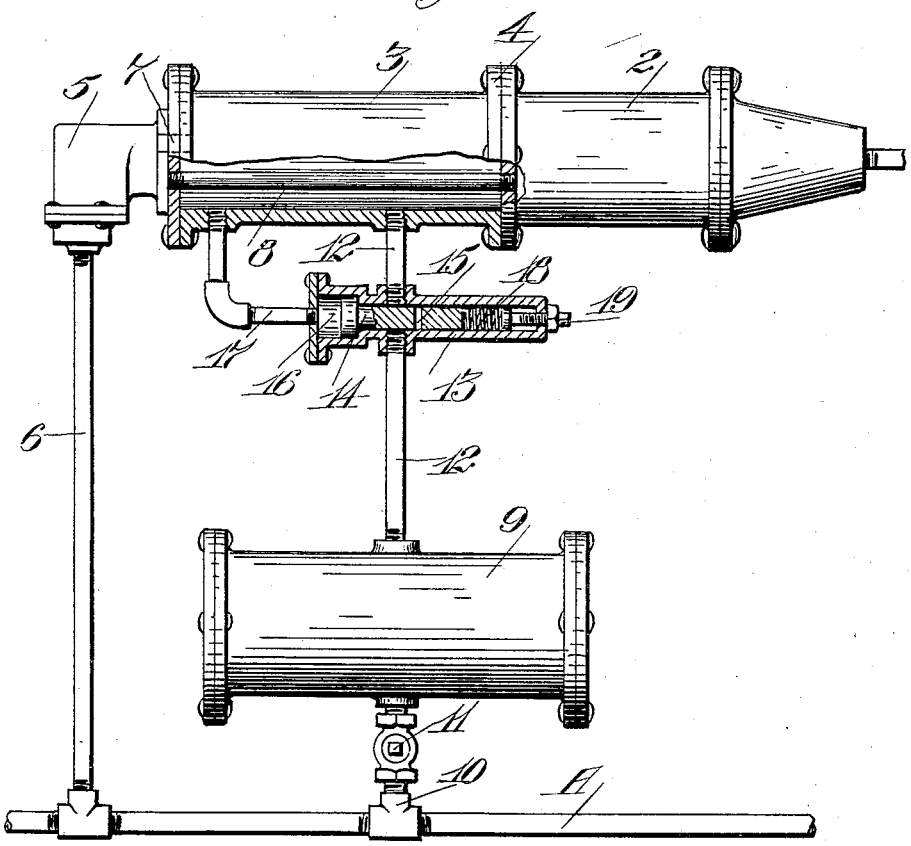

UNITED STATES PATENT OFFICE.

ARTHUR DOAN, OF ELMHURST, CALIFORNIA.

AIR-BRAKE SYSTEM.

969,046.  Specification of Letters Patent.  Patented Aug. 30, 1910.

Application filed November 13, 1909. Serial No. 527,843.

*To all whom it may concern:*

Be it known that I, ARTHUR DOAN, a citizen of the United States, residing at Elmhurst, in the county of Alameda and State of California, have invented new and useful Improvements in Air-Brake Systems, of which the following is a specification.

This invention relates to air brake systems for railway trains and the like.

The object of the present invention is to provide a simple, practical arrangement to regulate the pressure in the auxiliary reservoir, so that as the pressure therein becomes reduced to a point below which the brakes cannot work effectively, means are provided to build up the pressure in the auxiliary reservoir independent of the pressure in the train-line.

The invention consists of the parts and the construction and combination of parts as hereinafter more fully described and claimed, having reference to the accompanying drawings, in which—

Figure 1 is a diagrammatic sectional view of the improvement. Fig. 2 is a detail of the governor.

A is the train-line which carries the air or other fluid under pressure from the engine cab back through the train; the flow of air through the train-line being suitably controlled by the engineer to actuate the brakes.

2 is a brake cylinder by which the brakes are operated on a car, and 3 is an auxiliary reservoir having one of its heads 4 integral with the head of the brake cylinder, the two being made substantially in one piece, as shown, for a matter of convenience, compactness and simplicity.

5 is the ordinary triple valve connected by a pipe 6 with the train-line, and also having a connection 7 with the auxiliary reservoir and a separate connection with the brake cylinder through the pipe 8 which passes through the auxiliary reservoir. The air goes from the train-line up through the triple valve into the auxiliary reservoir, charging the same with the desired pressure. When a reduction of pressure is made in the train-line, the air passes back from the auxiliary reservoir through the triple valve and pipe 8 to the brake cylinder to operate the brake. In order, however, to keep the auxiliary reservoir charged up while the air is passing from the auxiliary reservoir to the brake cylinder, I employ the following connections: 9 is a high-pressure or storage reservoir connected by a pipe 10 with the train-line, in which pipe 10 is a check-valve to prevent back-flow from the high-pressure reservoir 9 to the train-line when pressure in the latter is reduced. This high-pressure reservoir is connected with the auxiliary reservoir by a pipe 12 in which is a governor 13, which latter ordinarily interrupts communication between the reserve or high-pressure reservoir and the auxiliary reservoir. This governor may be of any suitable description. As here shown, it consists of a piston valve 14 movable in a suitable casing, into which casing the two sections of pipe 12 are tapped; these pipe sections being out of communication at all times, except when they are brought into register with the port 15 in piston valve 14. One end of the piston valve 14 is acted on by air pressure in a chamber 16, which latter is in communication with the auxiliary reservoir through the pipe 17. The air pressure in chamber 16 from the auxiliary reservoir tends to move the valve in one direction to carry port 15 out of register with pipe 12, and so cut off communication between the reserve reservoir 9 and the auxiliary reservoir. The other end of the valve 14 is acted on by a regulating spring 18 which tends to move the valve to open communication between the two reservoirs through pipe 12 and port 15. The tension of the spring 18 is regulated by suitable means, as the hand-screw 19.

In practice, if the maximum train-line pressure is ninety pounds, the pressure in the auxiliary reservoir 3 and the reserve reservoir 9 when the brakes are off would be at ninety pounds. When working at ninety pounds pressure, the spring 18 will be set to exert approximately only a sixty pound pressure, so that as long as the pressure in the auxiliary reservoir remains above sixty pounds, valve 14 will be closed so as to cut off communication between reservoirs 9 and 3. If the brakes are set to full braking power, say forty-five pounds, the triple valve is operated by letting the air out of the train-line, and in the absence of my reserve reservoir and governor attachment, the pressure in the brake cylinder and auxiliary reservoir will become equalized at forty-five pounds. Where the governor is set at sixty pounds, however, the moment the pressure in the auxiliary reservoir becomes reduced below sixty pounds, the governor valve is opened, and the pressure in the auxiliary reservoir and brake cylinder is built up to sixty pounds, so that not only is a greater braking power applied by means of my reserve reservoir and governor attachment, than is possible without it, but the pressure is maintained in the auxiliary reservoir and brake cylinder. Also, by means of the reserve reservoir and governor, the auxiliary reservoir is charged up with air much quicker than through the triple valve.

In order, however, to produce a serviceable application of the brakes and prevent the brakes being set too suddenly, thereby producing what is called an emergency application of air, when the reserve reservoir 9 is brought into communication with the auxiliary reservoir 3, it is necessary that the flow of air from one reservoir to the other be comparatively slow. Therefore, port 15 is comparatively small, so there is no sudden equalization of pressures in the reservoirs 9 and 3.

Having thus described my invention, what I claim and desire to secure by Letters Patent is—

1. The combination in an air-brake system, of a train-line, a brake cylinder, an auxiliary reservoir, a reserve reservoir and a governor, connections between the auxiliary reservoir and train-line and between the reserve reservoir and train-line for charging the auxiliary and reserve reservoirs, means for controlling the admission of fluid from the auxiliary reservoir to the brake cylinder to operate the brakes, connections with the governor between the auxiliary and reserve reservoirs for the passage of fluid from the reserve reservoir to the auxiliary reservoir, and fluid-pressure connections between the governor and auxiliary reservoir for operating the governor to allow fluid to pass from the reserve reservoir to the auxiliary reservoir when the pressure in the latter falls below a predetermined point.

2. The combination in an air-brake system, of a train-line, an auxiliary reservoir connected with the train-line, a brake cylinder, and a reserve reservoir connected with the train-line, connection between the reserve reservoir and the auxiliary reservoir, a governor in said last-named connection consisting of a valve, said governor having connections with the auxiliary reservoir to move the valve to interrupt the connections between the reserve reservoir and the auxiliary reservoir, a regulating spring operative on the valve tending to move it to open communication between the reserve reservoir and auxiliary reservoir, and a triple valve in said connections between the auxiliary reservoir and train-line to control the admission of fluid to the brake cylinder.

3. In an air-brake system, the combination of a brake cylinder and an auxiliary reservoir arranged end to end and contiguous to one another, a train-line, a triple valve connected with the train-line and with the auxiliary reservoir, a pipe extending through the auxiliary reservoir and connecting the triple valve with the brake cylinder to charge the latter on the reduction of pressure in the train-line, a high-pressure reservoir connected with the train-line, and a governor controlled by the pressure in the auxiliary reservoir for controlling communication between the high-pressure and auxiliary reservoirs.

4. In an air-brake system, the combination of a brake cylinder and an auxiliary reservoir arranged end to end and contiguous to one another, a train-line, a triple valve connected with the train-line and with the auxiliary reservoir, a pipe extending through the auxiliary reservoir and connecting the triple valve with the brake cylinder to charge the latter on the reduction of pressure in the train-line, a reserve reservoir connected with the train-line and also connected with the auxiliary reservoir, and a governor in the connection between the reserve reservoir and the auxiliary reservoir.

5. The combination in an air-brake system, of a train-line, a brake cylinder, an auxiliary reservoir, a high-pressure reservoir, connections between the auxiliary reservoir and train-line and between the high-pressure reservoir and train-line, connections between the high-pressure reservoir and auxiliary reservoir, a governor valve in the last-named connections normally operative by the pressure in the auxiliary reservoir to cut off communication between the auxiliary and high-pressure reservoirs, and means acting on the valve in opposition to said pressure to open communication between said reservoirs, said governor valve and its connections operative to allow a slow flow of fluid from the high pressure reservoir to the auxiliary reservoir.

In testimony whereof I have hereunto set my hand in the presence of two subscribing witnesses.

ARTHUR DOAN.

Witnesses:
FREDERICK E. MAYNARD,
CHARLES EDELMAN.